(12) United States Patent
Gossett et al.

(10) Patent No.: US 7,733,943 B2
(45) Date of Patent: Jun. 8, 2010

(54) METHOD AND SYSTEM FOR TEMPORAL AUTOCORRELATION FILTERING

(75) Inventors: Carroll Philip Gossett, Mountain View, CA (US); Michial Allen Gunter, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/972,321

(22) Filed: Jan. 10, 2008

(65) Prior Publication Data

US 2008/0107159 A1 May 8, 2008

Related U.S. Application Data

(62) Division of application No. 10/299,285, filed on Nov. 18, 2002, now Pat. No. 7,352,833.

(51) Int. Cl.
*H04B 1/69* (2006.01)
*H04B 1/707* (2006.01)
*H04B 1/713* (2006.01)

(52) U.S. Cl. .................. 375/149; 375/148; 375/150; 375/362; 375/343; 370/342; 370/335

(58) Field of Classification Search .......... 375/147–150, 375/152, 142, 354, 362, 343; 370/342, 335
See application file for complete search history.

(56) References Cited

U.S. PATENT DOCUMENTS

| 4,358,844 | A | 11/1982 | Pirani |
| 4,578,676 | A | 3/1986 | Harrison, Jr. |
| 5,268,927 | A | 12/1993 | Dimos et al. |
| 5,410,568 | A | 4/1995 | Schilling |
| 5,623,485 | A | 4/1997 | Bi |
| 5,646,964 | A | 7/1997 | Ushirokawa et al. |
| 5,649,299 | A | 7/1997 | Battin et al. |
| 5,677,929 | A | 10/1997 | Asano et al. |

(Continued)

FOREIGN PATENT DOCUMENTS

CN 1301090 A 6/2001

(Continued)

OTHER PUBLICATIONS

Bernardini A. et al. Linear Prediction Methods for Interference Elimination in Spread Spectrum Systems, European Transaction on Telecommunications and Related Technologies, AEI, Milano, IT, vol. 1, No. 1, 1990, pp. 67-78, XP000170707, ISSN: 112-3862.

(Continued)

*Primary Examiner*—Phuong Phu
(74) *Attorney, Agent, or Firm*—Fish & Richardson P.C.

(57) ABSTRACT

An autocorrelation filter for use with a spread spectrum receiver. The autocorrelation filter can be used as a prefilter stage to reduce phase distortion present in a spread spectrum signal. The autocorrelation filter can be used to process the output from a lattice filter. The lattice filter is configured to remove magnitude distortion from the spread spectrum signal. The autocorrelation filter performs a series of correlations on the output of the lattice filter. The results of these correlations are integrated over a period of time to generate a running impulse response for characterizing and removing the phase distortion in the spread spectrum signal.

14 Claims, 9 Drawing Sheets

U.S. PATENT DOCUMENTS

| | | | |
|---|---|---|---|
| 5,687,191 | A | 11/1997 | Lee et al. |
| 5,691,974 | A | 11/1997 | Zehavi et al. |
| 5,715,236 | A | 2/1998 | Gilhousen et al. |
| 5,729,465 | A | 3/1998 | Barbaresco |
| 5,742,694 | A | 4/1998 | Eatwell et al. |
| 5,809,061 | A | 9/1998 | Shea et al. |
| 5,822,360 | A | 10/1998 | Lee et al. |
| 5,825,807 | A | 10/1998 | Kumar |
| 5,864,548 | A | 1/1999 | Liu |
| 5,872,540 | A | 2/1999 | Casabona et al. |
| 5,940,429 | A | 8/1999 | Lam et al. |
| 5,940,791 | A | 8/1999 | Byrnes et al. |
| 5,995,923 | A | 11/1999 | Mermelstein et al. |
| 6,005,891 | A | 12/1999 | Chadwick et al. |
| 6,009,118 | A | 12/1999 | Tiemann et al. |
| 6,009,129 | A | 12/1999 | Kenney et al. |
| 6,072,822 | A | 6/2000 | Naruse et al. |
| 6,091,725 | A | 7/2000 | Cheriton et al. |
| 6,091,760 | A | 7/2000 | Giallorenzi et al. |
| 6,128,332 | A | 10/2000 | Fukawa et al. |
| 6,169,912 | B1 | 1/2001 | Zuckerman |
| 6,173,331 | B1 | 1/2001 | Shimonishi |
| 6,185,246 | B1 | 2/2001 | Gilhousen |
| 6,185,426 | B1 | 2/2001 | Alperovich et al. |
| 6,211,828 | B1 | 4/2001 | Krylov et al. |
| 6,229,478 | B1 | 5/2001 | Biacs et al. |
| 6,249,760 | B1 | 6/2001 | Bossemeyer et al. |
| 6,256,609 | B1 | 7/2001 | Byrnes et al. |
| 6,370,183 | B1 | 4/2002 | Newson et al. |
| 6,393,047 | B1 | 5/2002 | Popovic |
| 6,411,645 | B1 | 6/2002 | Lee et al. |
| 6,418,147 | B1 | 7/2002 | Wiedeman |
| 6,426,977 | B1 | 7/2002 | Lee et al. |
| 6,449,305 | B1 | 9/2002 | Menich et al. |
| 6,463,089 | B1 | 10/2002 | Chauncey et al. |
| 6,496,474 | B1 | 12/2002 | Nagatani et al. |
| 6,501,733 | B1 | 12/2002 | Falco et al. |
| 6,507,573 | B1 | 1/2003 | Brandt et al. |
| 6,522,656 | B1 | 2/2003 | Gridley |
| 6,535,544 | B1 | 3/2003 | Partyka |
| 6,563,793 | B1 | 5/2003 | Golden et al. |
| 6,611,519 | B1 | 8/2003 | Howe |
| 6,611,600 | B1 | 8/2003 | Leber et al. |
| 6,621,796 | B1 | 9/2003 | Miklos |
| 6,640,209 | B1 | 10/2003 | Das |
| 6,657,986 | B1 * | 12/2003 | Laudel et al. ............... 370/342 |
| 6,665,825 | B1 | 12/2003 | Mobin et al. |
| 6,675,125 | B2 | 1/2004 | Bizjak |
| 6,678,341 | B1 | 1/2004 | Miyake et al. |
| 6,691,092 | B1 | 2/2004 | Udaya Bhaskar et al. |
| 6,754,282 | B1 | 6/2004 | Ross et al. |
| 6,826,241 | B2 | 11/2004 | Kahana |
| 6,970,681 | B2 | 11/2005 | Darabi et al. |
| 7,050,545 | B2 | 5/2006 | Tanrikulu |
| 7,103,026 | B2 | 9/2006 | Hall et al. |
| 2001/0033616 | A1 | 10/2001 | Rijnberg et al. |
| 2002/0106004 | A1 | 8/2002 | Tan |
| 2002/0118728 | A1 | 8/2002 | Mohseni et al. |
| 2002/0172180 | A1 | 11/2002 | Hall et al. |
| 2002/0191566 | A1 | 12/2002 | Fogel |
| 2003/0009325 | A1 | 1/2003 | Kirchherr et al. |
| 2003/0138031 | A1 | 7/2003 | Okubo et al. |
| 2003/0161339 | A1 | 8/2003 | Oishi et al. |
| 2003/0185286 | A1 | 10/2003 | Yuen et al. |
| 2004/0267860 | A1 | 12/2004 | Agami et al. |
| 2006/0062284 | A1 | 3/2006 | Li et al. |
| 2006/0251261 | A1 | 11/2006 | Christoph |

FOREIGN PATENT DOCUMENTS

| | | |
|---|---|---|
| EP | 0588598 | 3/1994 |
| EP | 0940947 | 9/1999 |
| EP | 1047215 | 10/2000 |
| GB | 2022954 | 12/1979 |
| GB | 2276794 | 10/1997 |
| WO | WO 00/01091 | 1/2000 |
| WO | WO 00/01092 | 1/2000 |
| WO | WO 00/11838 | 3/2000 |

OTHER PUBLICATIONS

Database WPI Section EI, Week 200247 Derwent Publications Ltd. London, GB; AN 2002-441855 XP002246945 & KR 2002 002 034 A (Geosystems Inc.) Jan. 9, 2002.

Devalla b., et al. "Adaptive connection admission control for mission critical real-time communication networks," Military Communication Conference, 1998 MILCOM 98, Proceedings, IEEE Boston, MA Oct. 18-21, 1998 NY, NY pp. 614-620.

Keiler et al., "Efficient Linear Prediction for Digital Audio Effects," Proceedings of the COST G-6 Conference on Digital Audio Effects (DAFX-00), Verona, Italy, Dece 7-9, 2000, pp. 1-6.

Lenstra, et al., "Analysis of Bernstein's Factorization Circuit," *Advances in Cryptology—ASIACRYPT 2002, 8$^{th}$ Int'l Conference on the Theory and Application of Cryptology and Information Security*, Queenstown, New Zealand, Dec. 1-5, 2002, 26 pages.

Newton, Harry, "Newton's Telecom Dictionary," ISBN # 1-57820-069-5, Malt Kelsey published, pp. 96-97.

Newton, Harry, "Newton's Telecom Dictionary," ISBN # 1-57820-069-5, Malt Kelsey published, pp. 17.

Newton, Harry, "Newton's Telecom Dictionary," ISBN # 1-57820-069-5, Malt Kelsey published, pp. 523.

Roche, C., et al., "Performance of congestion control mechanisms in wormhole routing networks," INFOCOM '97, Sixteen Annual Joint Conference of the IEEE Computer and Communications Societies, driving the Information Revolution, Proceedings IEEE Kobe, Japan, Apr. 7-11, 1997, Los Alamitos, CA pp. 1365-1372.

Rodriguez-Fonollosa, Jose A., et al., signal Processing V. Theories and Applications, Elsevier Science Publishers B.V., 1990 :A New Process for Adaptive 1IR Filtering Based on the Log-Area Ration Parameters, pp. 257-260.

Shan, Peijun, et al. DPS Research Laboratory Virginia Tech, the Bradley Department of Electrical and Computer Engineering, XP-0009322374 "FM Interference Suppression in Spread Spectrum Communications Using Time-Varying Autoregressive Model Based Instantaneous Frequency Estimation," pp. 2559-2562.

Shynk, John J. XP-002236570 Department of Electrical & Computer Engineering University of California, Ch2561-9/88/0000/1554 1988 IEEE, pp. 1554-1557.

Takawira, Adaptive Lattice Filters for Narrowband Interference Rejection in DATA SET Spread Spectrum Systems, published by IEEE, 1994, pp. 1-5.

Tianren Department of Electronic and Information Engineering, Hauzhong University of Science and technology, Wuhan, China CH2614-6/88/0000/1091, 1988 IEEE, p. 1091-1093.

Zeidler, et al. "Frequency Tracking Performance of Adaptive Lattice Filters." Conference Record of the Twenty-Fifth Asilomar Conference on Signals, Systems and Computers, 1991, Nov. 4-6, 1991, vol. 2, pp. 643-649.

\* cited by examiner

METHOD AND SYSTEM FOR TEMPORAL AUTOCORRELATION FILTERING

CROSS-REFERENCE TO RELATED APPLICATIONS

This application is a divisional application of and claims priority to U.S. application Ser. No. 10/299,285, filed on Nov. 18, 2002, which is herein incorporated by reference in its entirety.

FIELD OF THE INVENTION

The field of the present invention pertains to filtering techniques to reduce distortion effects in signal transmission and reception. More particularly, the present invention relates to using a temporal autocorrelation filter to remove phase distortion from spread spectrum signals.

BACKGROUND ART

Data communications represents one of the most rapidly evolving technologies in widespread use today. Data communications and data processing has become important to virtually every segment of the nation's economy. The demand for efficient and reliable data transmission systems has increased the requirement for the control of errors to enable the reliable reproduction of data.

Information needs to be reliably transmitted and received. This holds true for data communications as well as voice communications. Wireless transmission systems transmit data from a transmitter to a receiver through a communications channel. The communications channel is typically an over-the-air, RF transmission. Examples include cellular telephony applications, two way radio communications, wireless Ethernet, and the like. Transmission conditions, that is, the degree to which RF signals are distorted by various conditions of the communications channel (e.g., weather, multipath interference, multiple transmitter interference, etc.) are often problematic. A primary measure of the effectiveness of a wireless communications system is its reliability and performance irrespective of transmission conditions. Reliable transmission should be ensured even in the presence of significant interference, noise, distortion, or other problems with the communications channel.

One method for ensuring reliable transmission is to utilize efficient error control and correction techniques (ECC). Modern ECC processes are primarily implemented through error correction code schemes. Error control coding as implemented between a transmitting device and a receiving device incorporates information into a transmitted digital data stream (e.g., a signal) that allows the receiver to find and correct errors occurring in transmission and/or storage. Since such coding detects or corrects errors incurred in the communication, it is often referred to as channel coding. The transmitting side of the error-control coding adds redundant bits or symbols to the original signal sequence and the receiving side uses these bits or symbols to detect and/or correct any errors that occurred during transmission. In general the more redundant bits added to the transmitted sequence the more errors that can be detected and more redundancy is required for detection and correction than for detection alone. However, there exists several practical limits to the degree to which an efficient ECC scheme can compensate for problems with the communications channel.

Another method for ensuring reliable transmission is the use of sophisticated noise cancellation and/or filtering processes. Many of these processes utilize sophisticated encoding schemes to enhance the receiver's ability to filter out the effects of noise within the communications channel. One increasingly popular such process is CDMA, or Code Division Multiple Access. CDMA (or spread spectrum) is the general description for several digital wireless transmission methods in which signals are encoded using a pseudo-random sequence prior to transmission through the channel by the transmitter. This pseudo-random sequence is also known to the receiver. The receiver uses the pseudo random sequence to decode the received signal. The pseudo-random sequence encoding has the effect of spreading signal energy across a frequency spectrum of the communications channel. CDMA is one of several such "spread spectrum" techniques. CDMA uses unique spreading codes (e.g., the pseudo random sequences) to spread the base-band data before transmission. The receiver then uses a correlator to de-spread the desired signal, which is passed through a narrow bandpass filter. Unwanted signals, e.g., noise, will not be de-spread and will not pass through the filter, thus canceling their effects.

Because of its resistance to noise and other types of unwanted signals, prior art CDMA communications technologies have become widely used in cellular telephone applications. CDMA based cellular transmission covers a series of "cells" provided to a communications to subscribing users. A cell is the geographic area encompassing the signal range from one base station (a site containing a radio transmitter/receiver and network communication equipment). Wireless transmission networks are comprised of many overlapping cell sites to efficiently use radio spectrum for wireless transmissions.

However, even the more sophisticated prior art CDMA based cellular telephone systems are susceptible to signal noise and other forms of unwanted interference. For example, although the prior art CDMA strategy of spreading signal energy across a frequency band can effectively suppress many types of noise and interference, spreading signal energy across a wide frequency spectrum subjects that signal to a greater degree of interference from sources found within that spectrum. This problem is even more pronounced in those cases where the interference sources transmit a much greater amount of energy into a frequency spectrum in comparison to the desired signal.

One solution to this problem involves the use of notch filters to cancel out the known sources of interference (e.g., radio stations, telephone transmitters, etc.) within a given frequency band. Unfortunately, the major drawback to the solution is the fact that it can be virtually impossible to accurately assess and quantify the many different sources of interference within a crowded frequency band. The characteristics of the interfering signals vary significantly with the transmission conditions (e.g., transmitter power, multipath effects, fading, atmospheric bouncing, etc.), and the aggregate effect of the interference sources results in a significantly decreased transmission range and/or transmission data rate. Thus, even with a very robust and advanced ECC technique, noise, distortion, and interference within the communications channel can significantly impair even very sophisticated spread spectrum types of communications systems.

Thus what is required is a solution for implementing reliable and robust wireless communication in the presence of noise, distortion, and interference. What is required is a solution that can effectively cancel the effects of noise, distortion, and interference within a communications channel, and thereby increase the effective transmission range and transmission data rate of a wireless communication system. The present invention provides a novel solution to the above requirements.

SUMMARY OF THE INVENTION

The present invention provides a method and system for temporal autocorrelation filtering for implementing reliable and robust wireless communication in the presence of distortion. The filtering system of the present invention can effectively cancel the effects of distortion within a communications channel, and thereby increase the effective transmission range and transmission data rate of a wireless communication system.

In one embodiment, the present invention is implemented as an autocorrelation filter for use with a spread spectrum receiver. The autocorrelation filter can be used as a prefilter stage to reduce phase distortion present in a spread spectrum signal prior to decoding the signal in a decoding stage of the receiver. The autocorrelation filter is used to process either the received input signal directly, or an output signal from a lattice filter, and perform an autocorrelation on said signal. The lattice filter can optionally be included to also remove magnitude distortion from the spread spectrum signal, though this is not necessary to get the effect of reduced phase distortion. The autocorrelation filter first performs a correlation process on its input signal. The results of the correlation process are integrated over a period of time using an integration stage to generate a running impulse response characterizing the phase distortion of the spread spectrum signal. This running impulse response is then used as the tap weights (or coefficients) of a FIR filter applied to the input signal (possibly from the lattice filter). The spread spectrum signal emerges from the FIR stage with the phase distortion removed.

In this manner, optionally, the lattice filter removes the magnitude distortion present in the spread spectrum signal while leaving the phase distortion. Subsequent processing in the autocorrelation filter removes the remaining phase distortion present in signal. The output of the autocorrelation filter can then be processed in a subsequent decoding stage free of errors induced by distortion. Because magnitude distortion and phase distortion have been removed, the effective transmission range and transmission data rate of the wireless communication system is greatly increased. But even without the removal of magnitude distortion by the lattice filter, the autocorrelation filter alone offers significant improvement in effective range and/or data rate.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed to a method and system for temporal autocorrelation filtering for implementing reliable and robust wireless communication in the presence of distortion. The filtering system of the present invention can effectively cancel the effects of distortion within a communications channel, and thereby increase the effective transmission range and transmission data rate of a wireless communication system. The present invention and its benefits are further described below.

Figure 1:
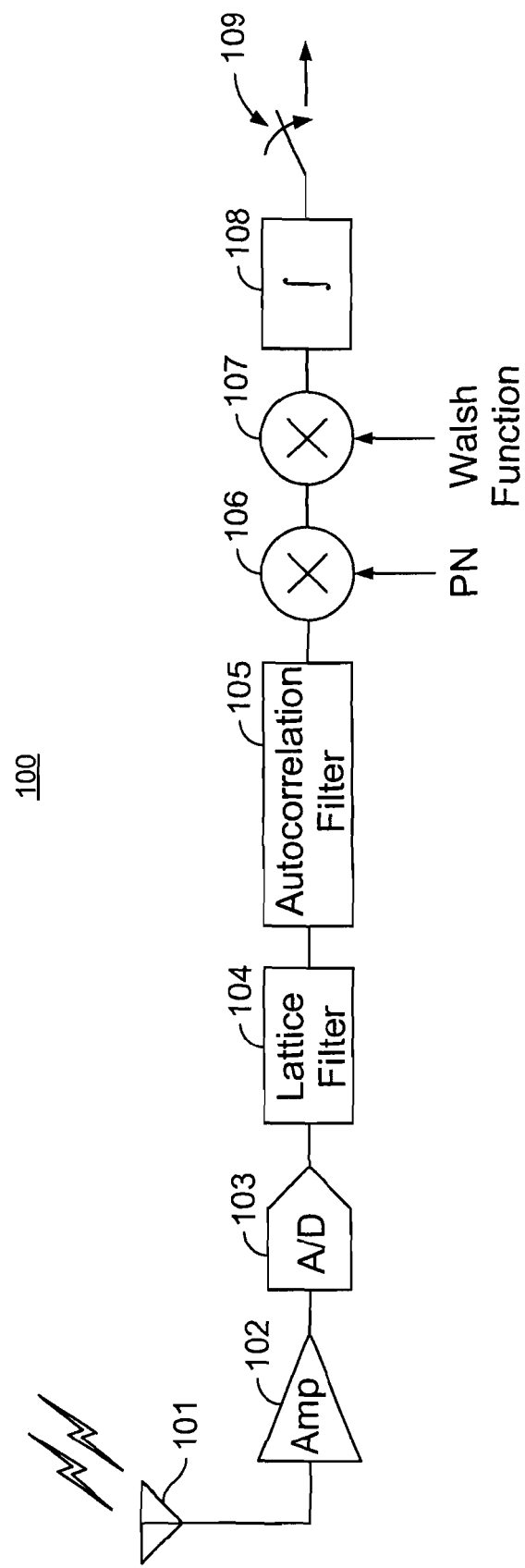
FIG. 1 shows an exemplary baseband direct sequence, spread spectrum CDMA receiver upon which the present invention may be practiced.

FIG. 1 shows an exemplary baseband direct sequence, spread spectrum CDMA receiver 100 upon which the present invention may be practiced. The CDMA receiver 100 uses Walsh functions and a separate pseudo-random code. The RF signal (e.g., the spread spectrum signal) is received over antenna 101. The signal is then amplified by an amplifier 102. In the present embodiment, amplifier 102 is comprised of two or more baseband video amplifiers coupled in series. This can provide a gain bandwidth product in the Terahertz range. Next, the analog spread spectrum signal is converted into an equivalent digital signal by an analog-to-digital converter 103. A lattice filter 104 is then used to filter out the periodic and quasi-periodic interference in the spectrum of interest. The lattice filter 104 also has the effect of filtering out magnitude distortion within the signal. (In alternate embodiments of the invention, the lattice filter may be omitted.) The output of the lattice filter 104 is then fed into an autocorrelation filter 105. The autocorrelation filter 105 performs an autocorrelation process on the output of the lattice filter 104. This autocorrelation process has the effect of filtering out phase distortion within the signal. Thus, when the signal emerges from the autocorrelation filter 105, the signal is free of magnitude distortion and phase distortion.

Subsequently, the signal is demodulated by multiplying it with the synchronized pseudo-random sequence 106. This is the same pseudo-random sequence associated with the transmitting base station. The signal is multiplied by a synchronized Walsh function 107 in order to eliminate interference due to other users' transmission within that cell. An integration 108 is followed by a sample and hold 109 function. Optionally, a bandpass filter is used to filter out the AM radio signals (e.g., 0.5 MHz to 1.5 MHz). Additionally, a high pass filter may be used to filter out the higher frequencies (e.g., above 30 MHz). Alternatively, notch filter(s) may be used to filter out the known interference signal(s) in the restricted bands.

It should be appreciated that although embodiments of the present invention are described in the context of a baseband direct sequence, spread spectrum CDMA communications system, embodiments of the present invention are capable of functioning with any type of spread spectrum technique and at any frequency. For example, embodiments of the present invention can be configured for functioning with other types of cellular telephone voice communications systems, data transfers, peer-to-peer communications, satellite, military, commercial, civilian, IEEE 802.11(b), Bluetooth, as well as a wide range of different wireless transmissions schemes, formats, and medium. One such spread spectrum system is described in detail in the patent application entitled, "A Baseband Direct Sequence Spread Spectrum Transceiver," filed Jan. 26, 2001, Ser. No. 09/772,110 and which is incorporated by reference in its entirety herein. Another spread spectrum system is described in the patent application entitled, "Application of a Pseudo-Randomly Shuffled Hadamard Function In A Wireless CDMA System," filed Dec. 5, 2000, Ser. No. 09/730,697 and which is incorporated by reference in its entirety herein.

Referring still to FIG. 1, the lattice filter 104 is configured to filter out periodic and quasi-periodic interference in the band of interest. In performing its function, the lattice filter 104 also filters out magnitude distortion present in the signal. Lattice filters, at times referred to as linear predictive coding (LPC) filters, are well known in the art (See, for example, L. R. Rabiner and R. W. Schafer, Digital Processing of Speech Signals). Additional descriptions of the operation of LPC filters and lattice filters can be found in the patent application entitled "An LPC Filter for Removing Periodic and Quasi-Periodic Interference from Spread Spectrum Signals" filed on Dec. 11, 2001, Ser. No. 10/015,013, which is incorporated herein by reference in its entirety.

The output of the lattice filter 104 is received by the autocorrelation filter 105. As described above, the lattice filter 104 functions in part to removing magnitude distortion from the signal. However, phase distortion remains. The autocorrelation filter 105 removes the remaining phase distortion. Subsequently, a comparatively clean signal is passed to the decoding stages of the receiver 100 (e.g., components 106-109).

Figure 2:
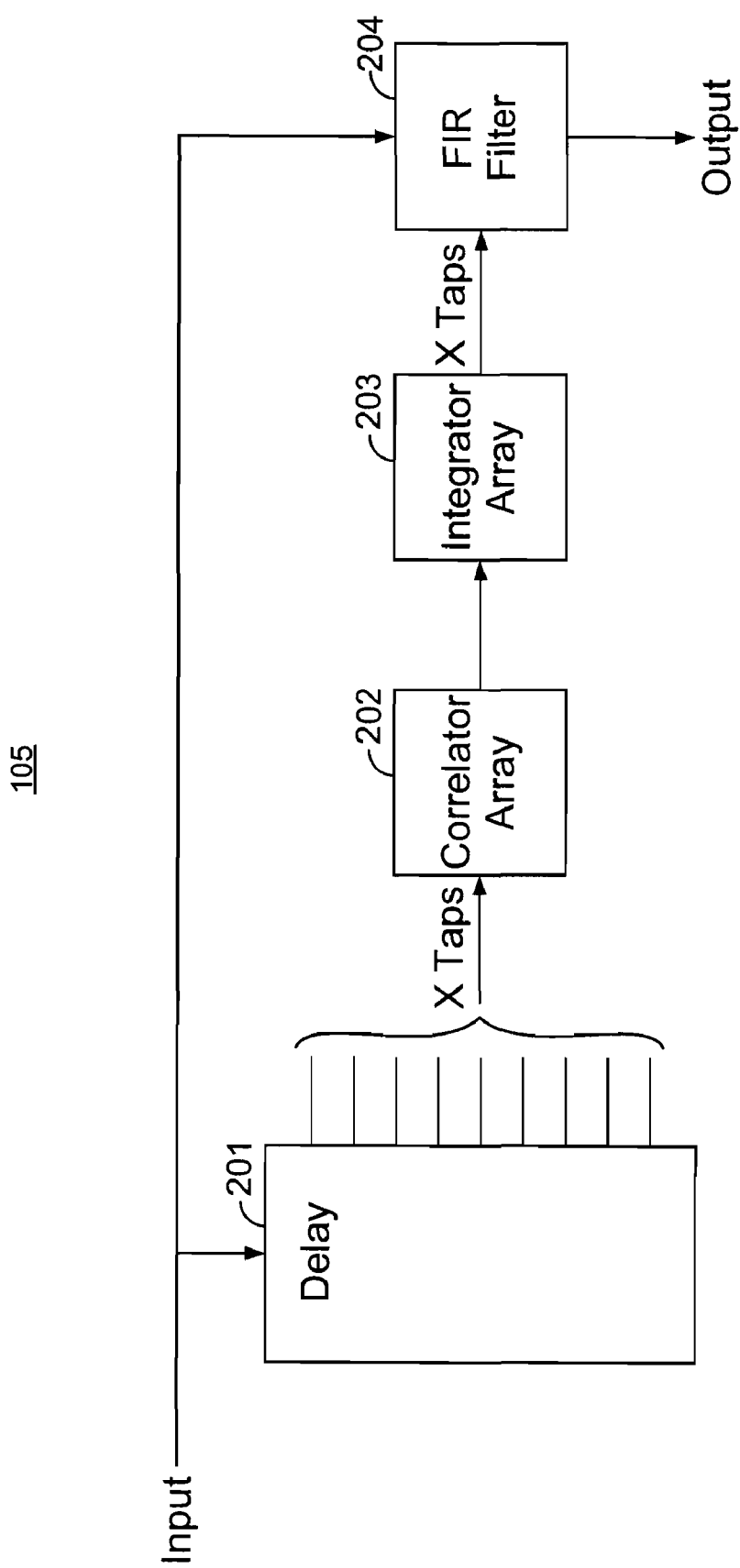
FIG. 2 shows a diagram depicting the internal components of an autocorrelation filter in accordance with one embodiment of the present invention.

FIG. 2 shows a diagram depicting the internal components of the autocorrelation filter 105 in accordance with one embodiment of the present invention. As depicted in FIG. 2, the autocorrelation filter 105 includes a delay unit 201 coupled to a correlator array 202. The output of the correlator array 202 is subsequently coupled to an integrator array 203. The outputs of the integrator array 203 are the tap weights applied to the input signal by the FIR filter 204.

In the present embodiment, the correlator array 202 implements an autocorrelation stage within the receiver 100. The integrator array 203 implements an integration stage within the receiver 100. The delay unit 201 functions by receiving the output of the lattice filter 104 and generating therefrom "X" number of delayed versions of the signal (e.g., 32 versions, 64 versions, 128 versions, or the like). Each of the X number of delayed versions of the signal, or samples, has an added incremental amount of delay and is coupled to the correlator array 202 via a respective tap. Thus, a first tap would comprise an earliest version of the signal whereas the last tap would comprise the latest, or most delayed, version of the signal. Thus for X number of delayed versions, there are X taps.

The X taps are respectively coupled to the correlator array 202 where the autocorrelation process is performed. The outputs of the correlator array 202 are subsequently coupled to the integrator array 203, which in turn provides the tap weights to the FIR filter 204. This arrangement is shown in greater detail in FIG. 3 below.

Figure 3:
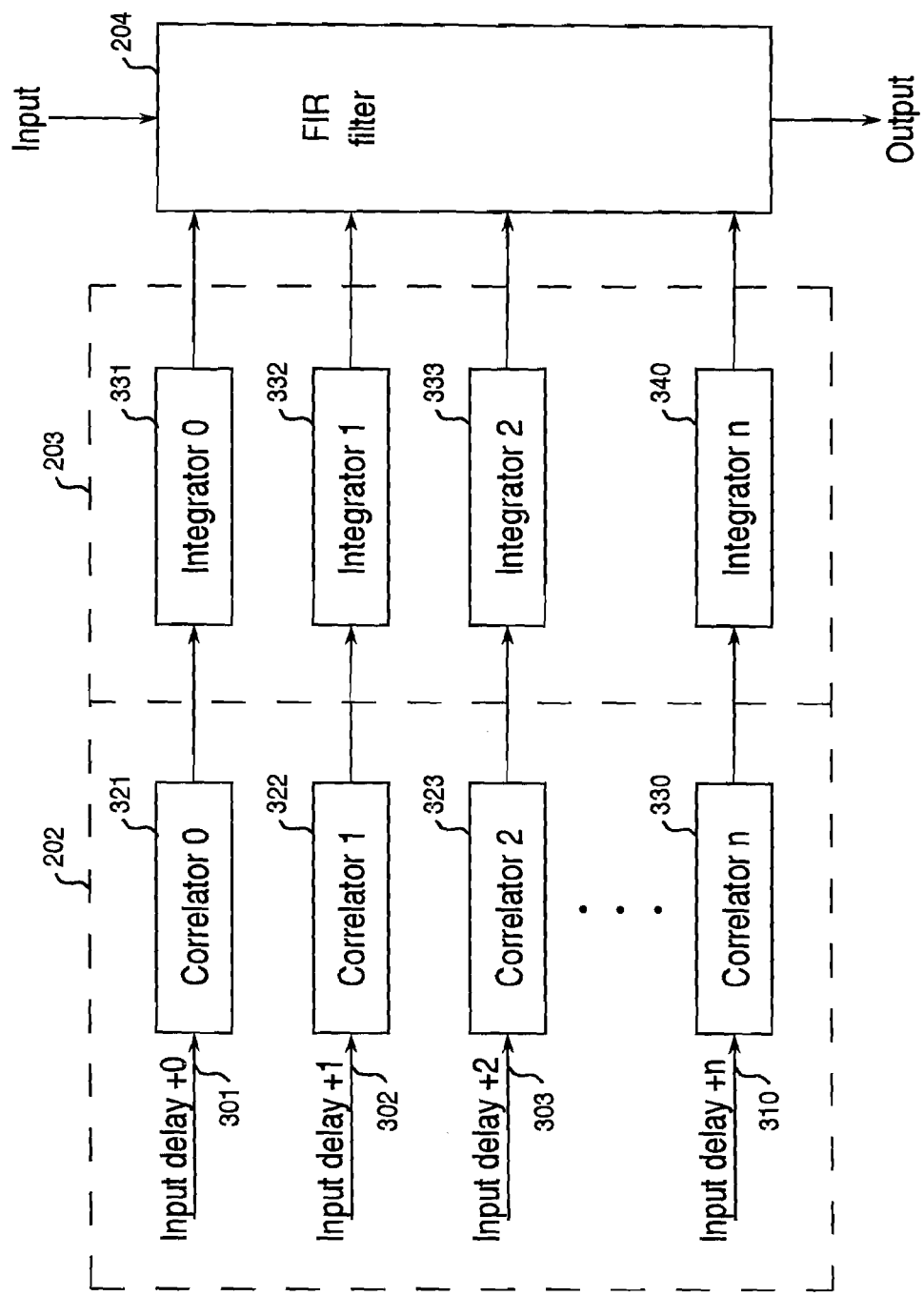
FIG. 3 shows a diagram of the internal components of a correlator array in accordance with one embodiment of the present invention.

FIG. 3 shows a diagram of the internal components of the correlator array 202 and integrator array 203 in accordance with one embodiment of the present invention. As depicted in FIG. 3, the correlator array 202 includes X number of input delay lines 301-310 (e.g., shown here as input delay+0, input delay+1, and so on). The X number of input delay lines couple to the corresponding X number of taps from delay unit 201. Each of the input delay lines 301-310 couples to its respective correlator 321-330 (e.g., shown here as correlator 0, correlator 1, correlator 2, and so on).

The correlators 321-330 perform respective correlation processes on each of the respective samples. In one embodiment, 32 samples are used with 32 correlators. This yields 32 correlation outputs, with each of the outputs having an added incremental time delay. Each of the outputs is then fed to the integrator array 331-340 as shown. This results in the integrator array 331-340 accumulating an average impulse response that spans the time span from the earliest of the 32 samples to the latest (e.g., wherein the samples continually arrive at a rate of 50 MHz in a typical implementation).

Thus, as samples of the signal are continuously received, the correlator array 202 and the integrator array 203 produce a running impulse response using the most recent 32 samples of the signal. This running impulse response describes the phase distortion impulse response characteristics of the communications channel. In accordance with the present invention, this running impulse response is used to perform an autocorrelation against the incoming data using the FIR filter 204, which has the effect of canceling out the phase distortion in the signal. As described above, the lattice filter 104 removes magnitude distortion from the signal. Once processed by the correlator array 202 and the integrator array 203, phase distortion is also removed from the signal by the FIR filter 204.

As used herein, temporal autocorrelation as implemented by the autocorrelation filter 105 functions by processing the temporal dependence evident between successive samples. Generally, as known by those skilled in the art, temporal autocorrelation analyzes dependence across samples separated in time (e.g., by the added time increments of the X number of taps).

Figure 4:
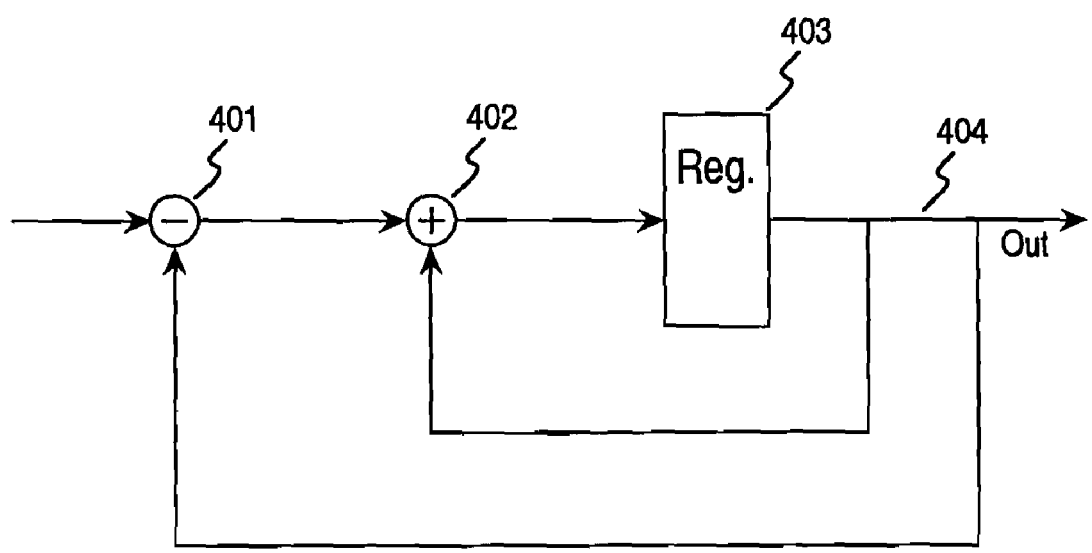
FIG. 4 shows a diagram of the internal components of an integrator in accordance with one embodiment of the present invention.

Referring now to FIG. 4, a diagram showing the internal components of one element of the integrator array 203 in accordance with one embodiment of the present invention is shown. As depicted in FIG. 4, the integrator array 203 is implemented as a "leaky" integrator, wherein the integrator array 203 integrates its input over time (e.g., successive samples) while decaying, or leaking, at a rate proportional its activity.

In the present embodiment, each leaky integrator in the integrator array 203 includes an accumulator 403 coupled to a positive feedback node 402 and a negative feedback node 401. The positive feedback node 402 provides the accumulation function, wherein the value of successive samples is added to the accumulator. The scaled down (typically by right shifting, though multiplying can be substituted if more precision is needed in the decay rate) negative feedback node 401 provides the decay rate, or leakage rate. Thus, in the example where X incremental samples are received from the correlator array 202, the output of the integrator array 203 will be a running impulse response spanning the time period of the X number of samples.

Figure 5:
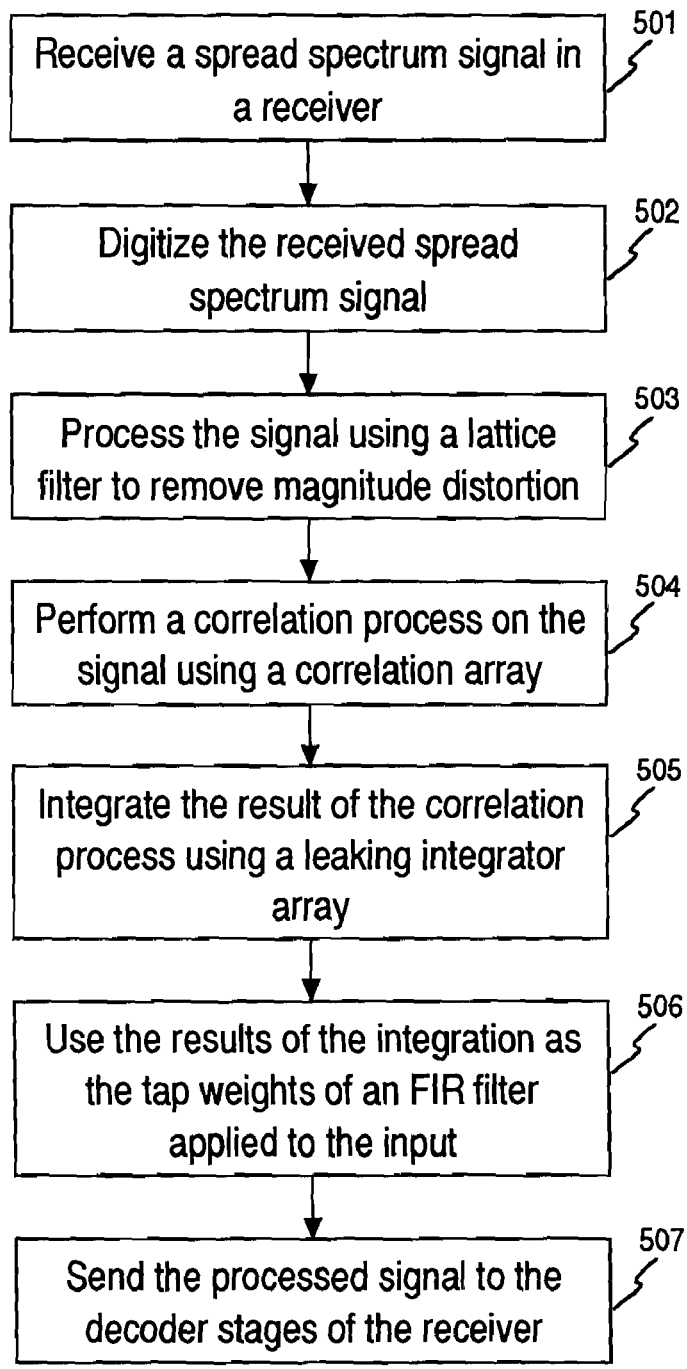
FIG. 5 shows a flowchart of the steps of a magnitude distortion and phase distortion filtering process in accordance with one embodiment of the present invention.

FIG. 5 shows a flowchart of the steps of a process 500 in accordance with one embodiment of the present invention. As depicted in FIG. 5, process 500 shows the operating steps of a receiver (e.g., receiver 100 of FIG. 1) performing magnitude distortion filtering and phase distortion filtering in accordance with one embodiment of the present invention.

Process 500 begins in step 501, where the receiver receives the spread spectrum signal from the communications channel (e.g., the airwaves) via an antenna (e.g., antenna 101). In step 502, the received spread spectrum signal is digitized using an analog to digital converter (e.g., analog to digital converter 103). In step 503, the digitized spread spectrum signal is processed using a lattice filter to remove magnitude distortion. As described above, the lattice filter (e.g., lattice filter 104) is configured to filter out periodic and quasi-periodic signals in the band of interest. In performing this function, the lattice filter 104 also filters out magnitude distortion present in the signal. In step 504, a correlation process is performed on the signal using a correlation array (e.g., correlator array 202 of FIG. 2).

Referring still to process 500 of FIG. 5, as described above, the correlation process functions in part by processing the temporal dependence evident between successive samples. In step 505, the results of the correlation process are integrated using a leaky integrator (e.g., integrator array 203). As described above, the integrator array 203 integrates its input over time (e.g., successive samples) while decaying, or leaking, at a rate proportional its activity. Thus, in a case where X incremental samples are received from the correlator array 202, the output of the integrator array 203 will be a running impulse response spanning the time period of the X number of samples. Subsequently, in step 506, this running impulse response becomes the tap weights for an FIR filter applied to the input signal. The processed signal at step 507 is now free of magnitude distortion and phase distortion.

Figure 6:
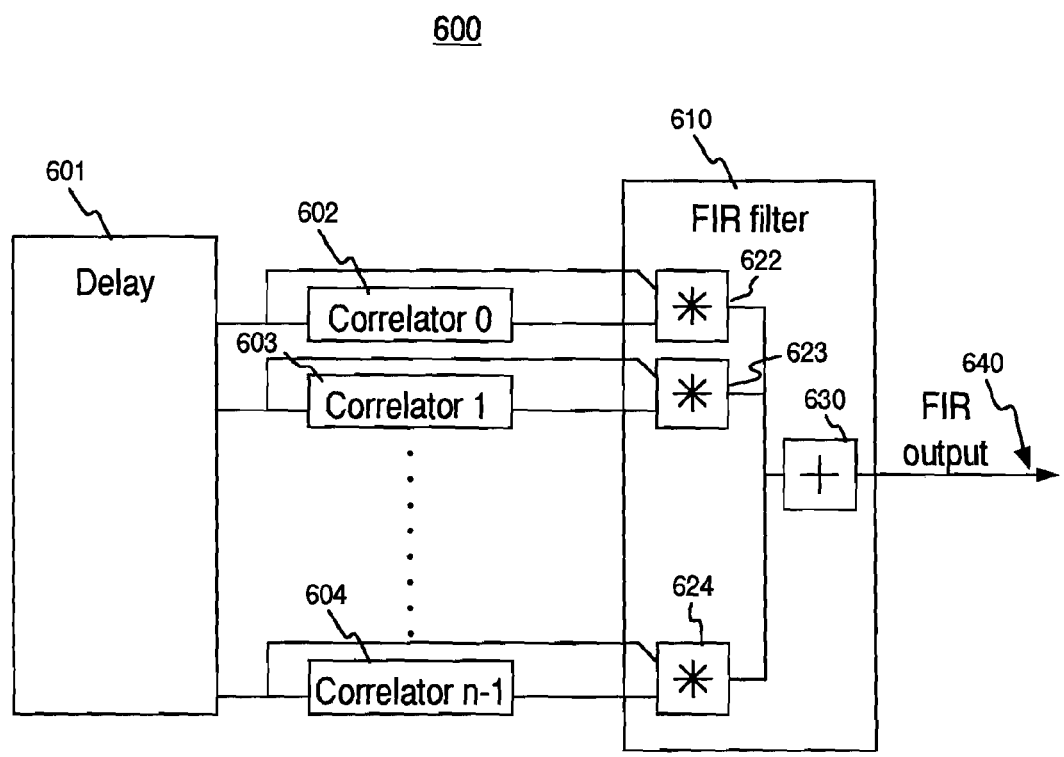
FIG. 6 shows a more detailed diagram of the components of an autocorrelation filter in accordance with one embodiment of the present invention.

FIG. 6 shows a more detailed diagram of the components of an autocorrelation filter 600 in accordance with one embodiment of the present invention. As depicted in FIG. 6, the more detailed diagram of the autocorrelation filter 600 shows a delay unit 601 coupled to a correlator array comprising a plurality of correlators 602-604. The outputs of the correlators 602-604 are integrated by a finite impulse response filter 610 into an output 640 as shown.

The autocorrelation filter 600 embodiment shows a delay unit 601 that functions by producing a number of delayed versions of the signal (e.g., "n" number of delay versions) and respectively coupling the delayed versions to the correlators 602-604 in substantially the same manner as the delay unit 201 of FIG. 2. As shown in FIG. 6, correlator 0 (e.g., correlator 602) receives the least delayed version of the signal, while correlator n−1 (e.g., correlator 604) receives the most delayed version of the signal, with each of the delayed versions having an added incremental amount of delay.

The correlators 602-604 produce respective correlator outputs which are coupled to respective multipliers 622-624. The multipliers 622-624 function by multiplying the correlator outputs with the respective delayed versions of the signal from the delay unit 601 as shown. The outputs of the multipliers 622-624 are then combined using a summation unit 630, which then produces the finite impulse response (FIR) filter output 640.

Figure 7:
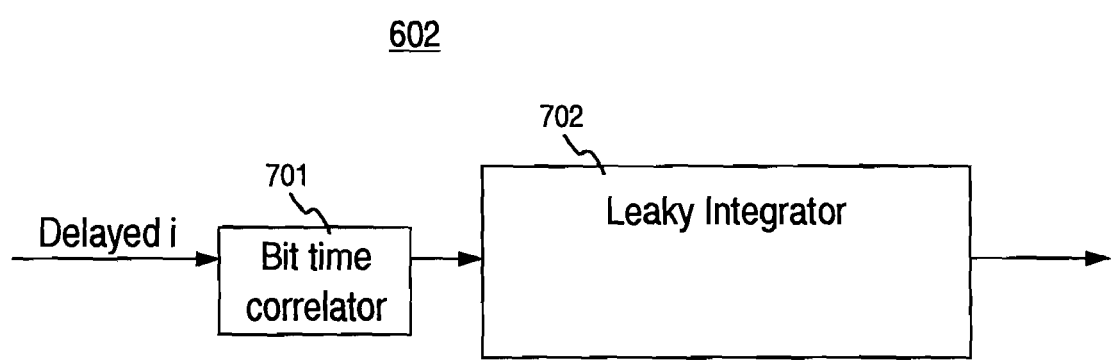
FIG. 7 shows a diagram depicting the internal components of one of the correlators of the autocorrelation filter of FIG. 6 in accordance with one embodiment of the present invention.

FIG. 7 shows a diagram depicting the internal components of one of the correlators (e.g., correlator 602) of the autocorrelation filter 600 in accordance with one embodiment of the present invention. As shown in FIG. 7, in the present embodiment, the correlator comprises a bit-time correlator 701 coupled to a leaky integrator 702. The bit-time correlator 701 and the leaky integrator 702 perform a correlation, wherein the incoming delayed signal (e.g., delayed i) is multiplied by the expected signal and summed.

Figure 8:
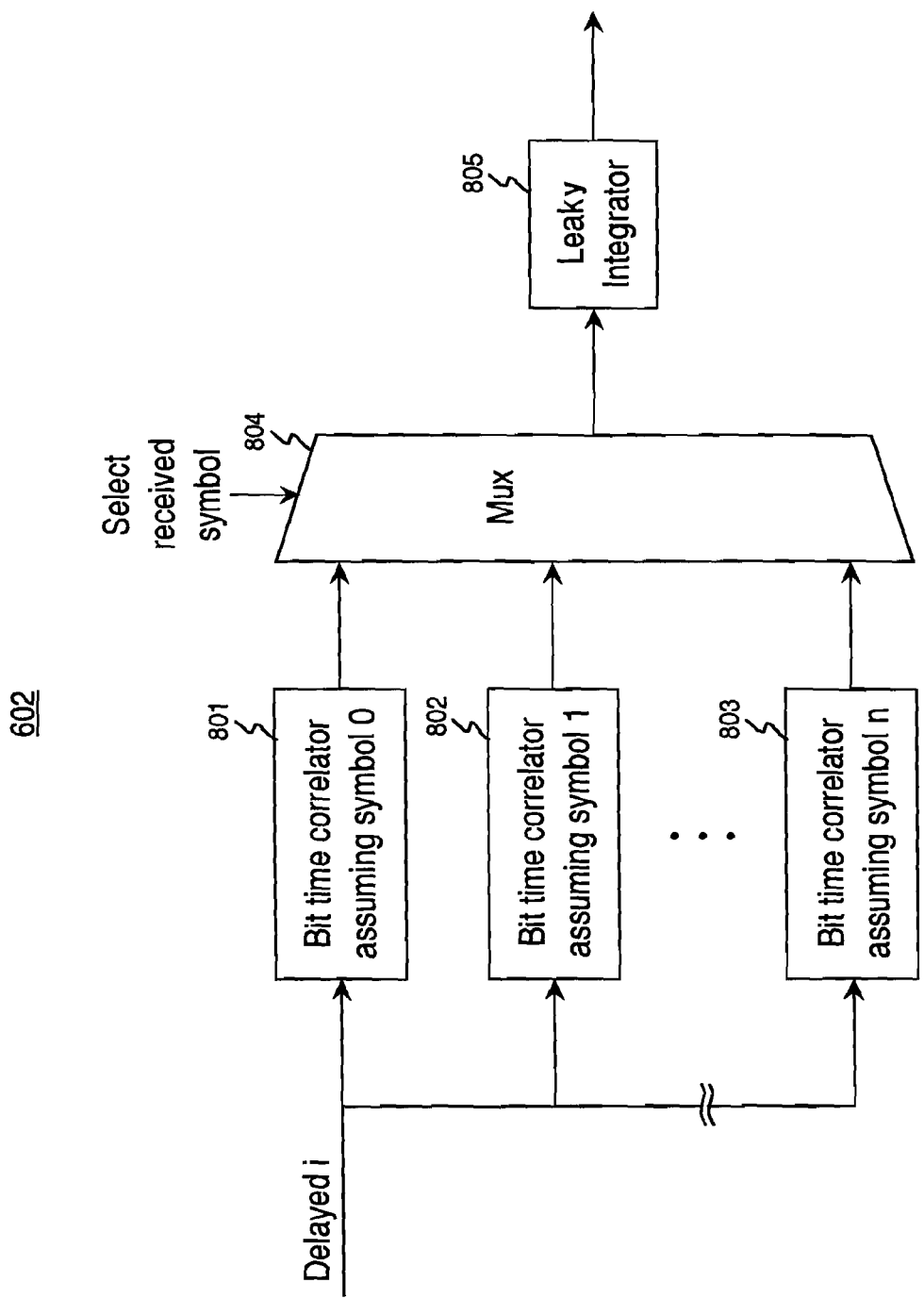
FIG. 8 shows an alternate embodiment of FIG. 7 capable of processing unknown transmitted symbols.

FIG. 8 shows an alternate embodiment of FIG. 7, for the case where the symbol actually sent by the transmitter is not known until after it is fully decoded. For this case, a plurality of bit time correlators 801-803 are used, each assuming one of the N possible transmitted symbols. Once the decoder has decided which symbol was sent, multiplexer 804 selects which bit time correlator output to use as input to leaky integrator 805.

In this manner, diagram 800 shows a method in accordance with one embodiment of the present invention of handling the case where the expected signal is being received while its actual value is not yet known. To handle this situation, in the present embodiment, for each delay amount (e.g., delay i), the data receive accumulators are duplicated (e.g., accumulator array 801-803). The present embodiment takes advantage of the fact that the decoded data received using the FIR output 640 are more reliable than the "answer" at each delay amount (e.g., delay i) because they use phase-distortion corrected inputs. In other words, all the energy that is spread out in time is re-concentrated and used by the data decoder fed from FIR output 640, including any ECC applied by the decoder.

It should be noted that although the bit-time correlator embodiment depicted in FIG. 8 includes a full copy of the data receive accumulators (e.g., accumulator array 801-803) for each delay i, more simplified implementations are possible. For example, particular embodiments could use various multiplexing schemes to reduce hardware redundancy. For example, there could be fewer (e.g. only one) bit-time correlators than delay amounts and/or each bit-time correlator could assume that particular subset of data values was being transmitted with no modification to the leakily integrated value being computed if that assumption is incorrect. Additionally, it should be noted that if there is a full copy of the accumulators at each delay i tap, there would consequently be no need for the FIR filter (e.g., FIR filter 610), thereby providing a less expensive implementation. In such an implementation, the same computation could be done using the bit-time correlators at the delay taps of the delay unit (e.g., delay unit 601).

Figure 9:
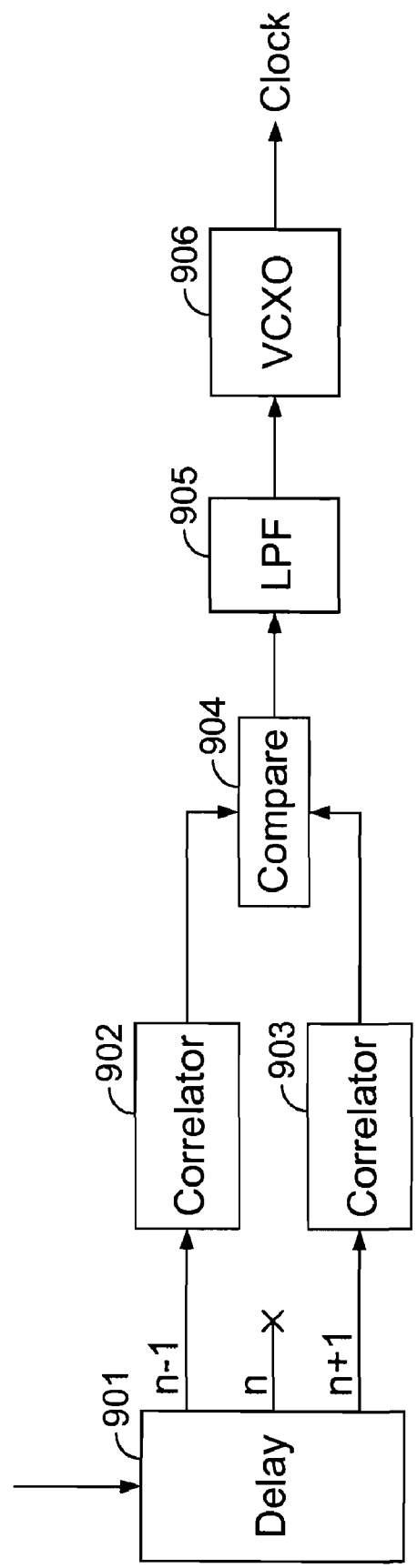
FIG. 9 shows a phase-locked loop implementation for synchronizing the receiver to the transmitted signal taking advantage of special properties of the output of the autocorrelation filter.

FIG. 9 shows a well known method for synchronizing the receiver's digital clock to the transmitted signal. The received signal is fed into a three-tap delay line 901, with the two side taps sent to correlators 902 and 903. The magnitudes of these correlations on either side of where the correlation peak is expected are compared by comparator 904. This determines whether the correlation peak is too far to one side or the other. After analog filtering 905, a control voltage is applied to a voltage controlled oscillator 906, producing a clock.

In the absence of the autocorrelation filtering of the present invention, the above synchronization method will typically be unstable, and thus, not function properly. This is because there is typically too much delay in the correlators 902 and 903. However, if the input to delay 901 comes from the signal processed by the autocorrelation filter 105, rather than the unprocessed received signal, the overall system becomes stable. This is because the phase correction process of the autocorrelation filter partially undoes the phase error, but with a slight lag (due to the leaky integrators 332-340). Thus, rather than being a phase locked loop, this becomes a frequency locked loop, which allows the phase to slip (slowly). This phase slip can then be corrected by digitally shifting the samples by integer amounts, as needed to center the autocorrelation window at delay 201. Frequency locked loops are generally much more stable than phase locked loops, even in the face of the significant delay due to correlators 902 and 903. Improving the quality of the clock synchronization greatly increases the quality of the decoded received signal.

Thus, embodiments of the present invention are directed to a method and system for temporal autocorrelation filtering for implementing reliable and robust wireless communication in the presence of distortion. The filtering system of the present invention can effectively cancel the effects of interference and distortion within a communications channel, and thereby increase the effective transmission range and transmission data rate of a wireless communication system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for generating a synchronization clock signal for a receiver, comprising:
   partially removing phase with lag from a spread spectrum signal by using an autocorrelation filter;
   generating a first correlation and a second correlation using respective correlators configured to receive the output of the autocorrelation filter;
   comparing the first correlation and the second correlation using a comparator to locate a peak correlation and produce a corresponding comparator output;
   controlling a voltage controlled oscillator by using the comparator output; and
   producing the synchronization clock signal by using an output of the voltage controlled oscillator.

2. The method of claim 1 further comprising:
   locating the peak correlation by using the comparator to locate the first correlation on the less delayed side of the peak correlation and locate the second correlation on the more delayed side of the peak correlation.

3. The method of claim 2 further comprising:
   generating a first delayed input for the first correlation and a second delayed input for the second correlation, the first delayed input and the second delayed input produced using a delay line.

4. The method of claim 1 further comprising:
   centering the peak correlation between the first correlation and the second correlation by shifting a plurality of samples of the output of the autocorrelation filter.

5. The method of claim 4 further comprising:
   shifting the samples by an integer amount to center the peak correlation between the first correlation and the second correlation.

6. A system for generating a synchronization clock signal for a receiver, the system comprising:
   an autocorrelation filter arranged to partially remove phase with lag from a spread spectrum signal;
   a first and second correlator arranged to receive the output of the autocorrelation filter and to generate a first correlation and a second correlation, respectively;
   a comparator to compare the first correlation to the second correlation to locate a peak correlation and produce a corresponding comparator output; and
   a voltage controlled oscillator that is controlled by the comparator output and that produces an output for use as the synchronization clock signal.

7. The system of claim 6, wherein the comparator is configured to locate the peak correlation by locating the first correlation on the less delayed side of the peak correlation and locating the second correlation on the more delayed side of the peak correlation.

8. The system of claim 7 further comprising:
   a delay line arranged to produce a first delayed input for the first correlation and a second delayed input for the second correlation.

9. The system of claim 6 further comprising:
   a shifter to center the peak correlation between the first correlation and the second correlation by shifting a plurality of samples of the output of the autocorrelation filter.

10. The system of claim 9, wherein the shifter is further arranged to shift the samples by an integer amount to center the peak correlation between the first correlation and the second correlation.

11. The system of claim 6, wherein the autocorrelation filter includes a delay unit and a correlator array located after the delay unit.

12. The system of claim 11, wherein the autocorrelation filter further includes an integrator array located after the correlator array.

13. The method of claim 1, wherein partially removing phase with lag from a spread spectrum signal by using an autocorrelation filter comprises:
   providing the spread spectrum signal to a delay unit; and
   providing an output from the delay unit to a correlator array.

14. The method of claim 13, wherein partially removing phase with lag from a spread spectrum signal by using an autocorrelation filter further comprises providing an output from the correlator array to an integrator array.

* * * * *